United States Patent [19]
Freal et al.

[11] Patent Number: 4,800,267
[45] Date of Patent: Jan. 24, 1989

[54] OPTICAL FIBER MICROBEND HORIZONTAL ACCELEROMETER

[76] Inventors: James B. Freal; Clarence J. Zarobila; Charles M. Davis, all of 360 Herndon Pkwy., Ste. 1200, Herndon, Va. 22070

[21] Appl. No.: 70,175

[22] Filed: Jul. 6, 1987

[51] Int. Cl.⁴ .......................... H01J 5/16; H01J 40/14
[52] U.S. Cl. ................................ 250/227; 250/231 R; 73/517 R
[58] Field of Search ............ 250/227, 231 R; 73/705, 73/517 R, 517 AV, 517 A, 517 B, 518

[56] References Cited

U.S. PATENT DOCUMENTS

| | | | |
|---|---|---|---|
| 2,738,392 | 3/1956 | Talbott, Jr. | 200/83 |
| 3,297,982 | 1/1967 | Beach | 340/17 |
| 4,226,120 | 10/1980 | Nissl | 73/517 R |
| 4,342,907 | 8/1982 | Macedo et al. | 250/227 |
| 4,459,477 | 7/1984 | Asawa et al. | 250/227 |
| 4,678,903 | 7/1987 | Wlodarczyk et al. | 250/231 R |

Primary Examiner—David C. Nelms
Assistant Examiner—William L. Oen
Attorney, Agent, or Firm—Kerkam, Stowell, Kondracki, & Clarke

[57] ABSTRACT

A highly sensitive microbend horizontal fiber-optic accelerometer has been conceived, particularly useful in seismological research where minute accelerations must be detected. The device uses a cantilever beam and the compliance of an optical fiber mounted between deforming teeth to act as the springs in the accelerometer's spring-mass system. Acceleration is detected by sensing the changes in the intensity of light propagating through the deformed fiber due to the motion of the mass relative to the case. Accelerations as small as 5 $\mu$g at 1 Hz can be detected with a dynamic range of 100 dB.

14 Claims, 4 Drawing Sheets

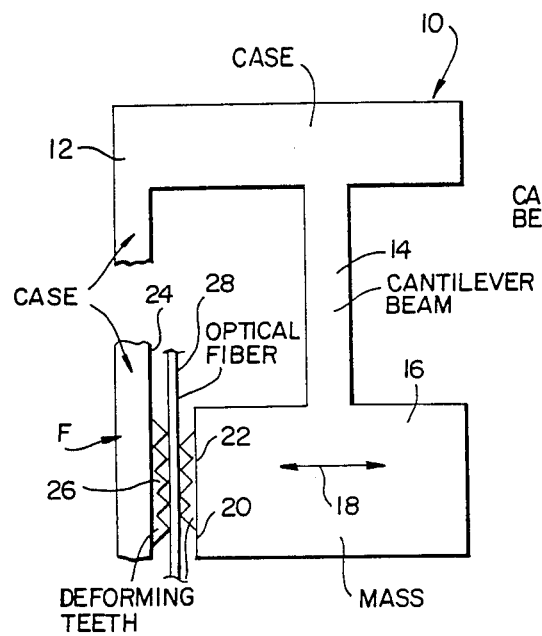
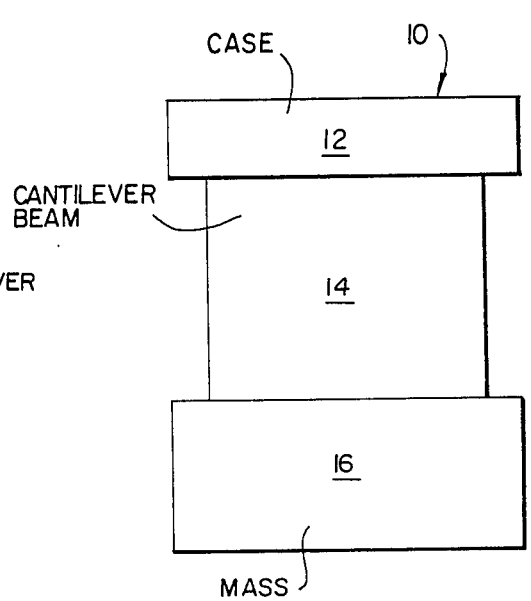
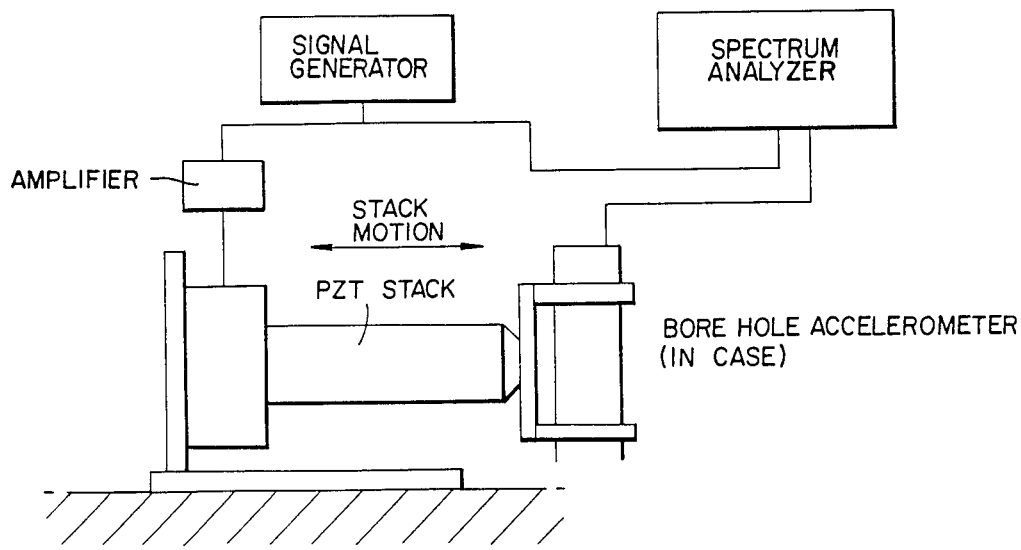

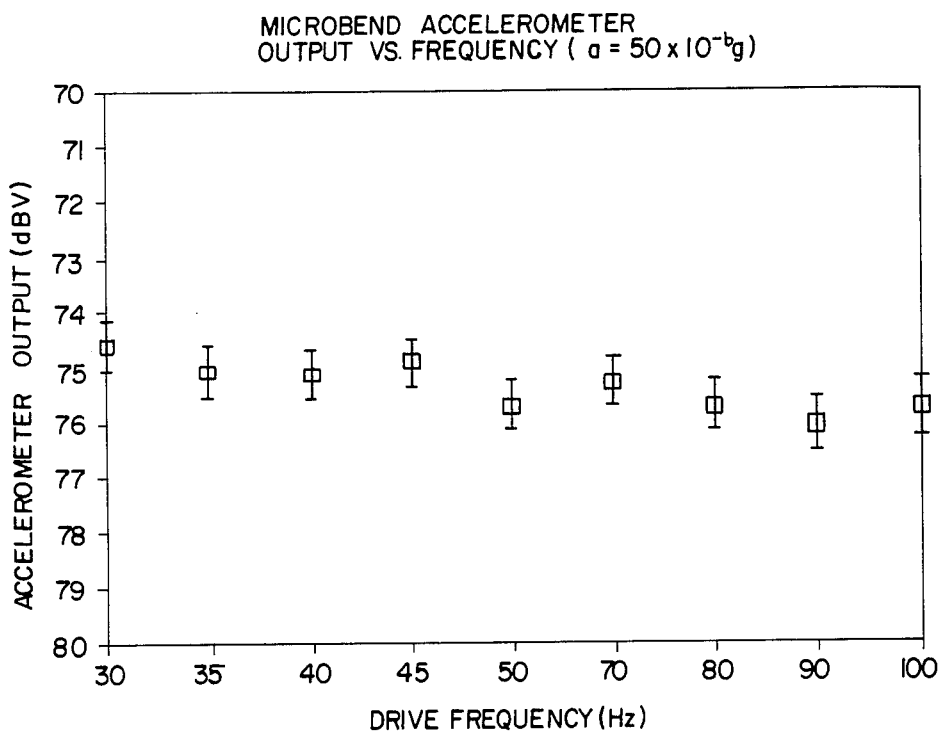
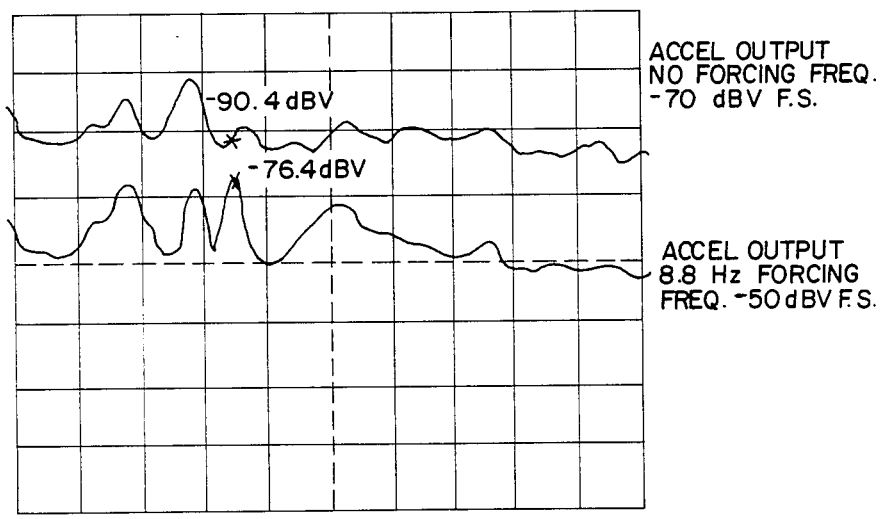

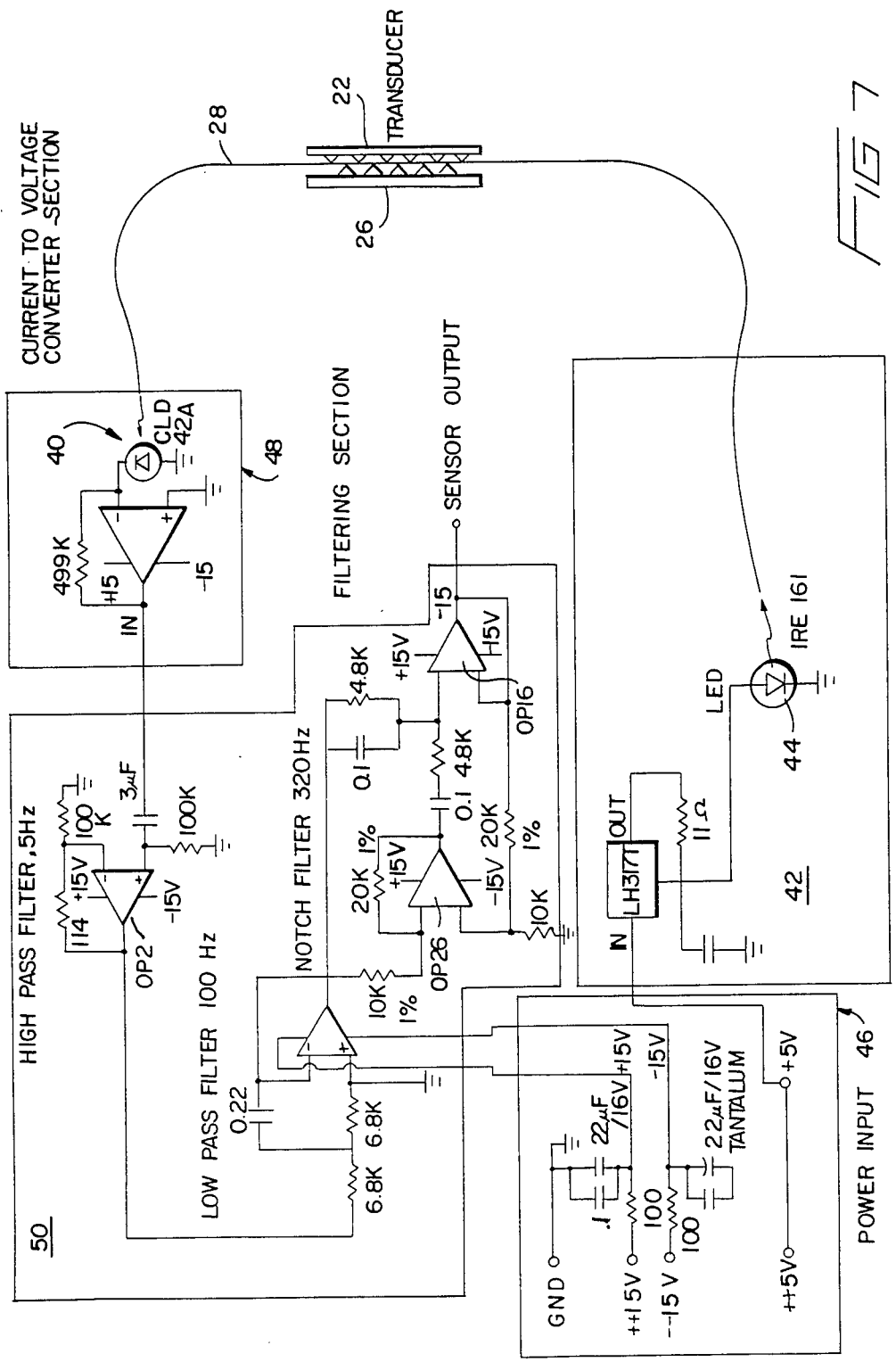

OPTICAL FIBER MICROBEND HORIZONTAL ACCELEROMETER

BACKGROUND OF THE INVENTION

The microbending of an optical fiber has been considered a simple and rugged design approach for a highly sensitive motion detector. The components required for such a device are simple, inexpensive and easily obtained. All that is required is one optical fiber, a light source (such as an LED) and detector with associated control electronics, and a means of modulating the bends in the fiber. In order to take advantage of the sensitivity of the microbend approach, mechanical designs that take full advantage of the large dynamic range and the minute displacements involved must be considered. At the same time, the mechanical and optical limitations of the sensing mechanism must be dealt with.

Sensors employing microbend technology are known in the art and reference is made to the Macedo et al U.S. Pat. No. 4,342,907.

Fiber optic accelerometers are also known and the Davis et al Pat. No. 4,322,829 is an example, as is the Nissl Pat. No. 4,226,120.

SUMMARY OF THE INVENTION

The fiber optic microbend accelerometer of the invention may be generally defined as including a rigid housing, a beam connected at one end to the housing, and a mass connected at the other end of the beam, the connected mass being free to move within the housing upon application of force to the housing in a direction normal to the plane of the beam. A pair of fiber deforming teeth sets mounted in opposed relation, one to the mass and the other to the housing, and an optical fiber positioned between the pair of teeth sets and in contact with the teeth.

BRIEF DESCRIPTION OF THE DRAWING

FIG. 3A illustrates a horizontal microbend accelerometer;

FIG. 3B is an end view of the structure shown in FIG. 3A;

FIG. 4 illustrates an experimental set up for testing accelerometer sensitivity;

FIG. 5 is a chart of accelerometer output vs drive frequency for constant acceleration;

FIG. 6 is a chart of the signal-to-noise ratio at 8.8 Hz for a 20-$\mu$g acceleration; and FIG. 7 is a circuit diagram for use with the accelerometer.

DESCRIPTION OF PREFERRED EMBODIMENT

Figure 1:
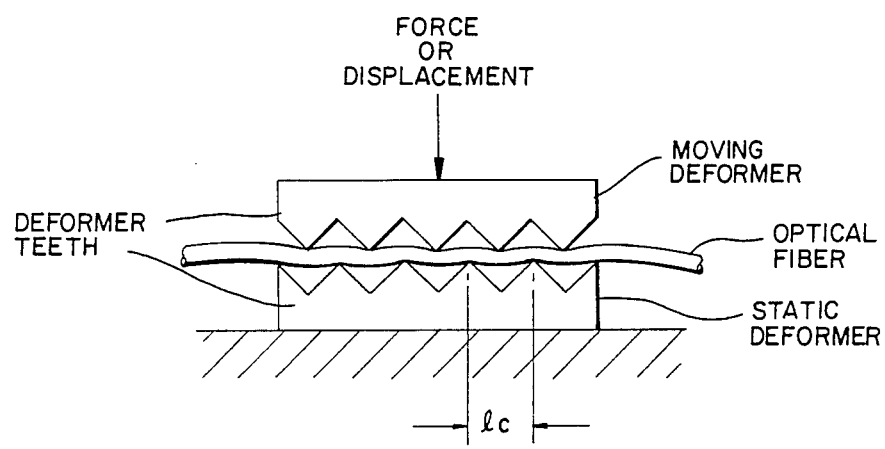
FIG. 1 is a diagrammatic illustration of a microbend transducer.

Referring to FIG. 3, 10 generally designates a microbend fiber-optic accelerometer which includes a housing 12. From one wall of the housing, is attached a cantilevered beam 14 to the free end of which is attached a mass 16. The mass is free to move in the direction of the directional arrow 18 upon the application of a force F which is normal to the plane of the beam 14. Attached to one face 20 of mass 16 is a set of deforming teeth 22 and to the wall 24 of the case or housing 12 is mounted a complimentary set of deforming teeth 26. Between the teeth 22 and 26 is an optical fiber 28, the outer surface of which is in contact with the deforming teeth 22 and 26.

Every optical fiber is sensitive to microbending, some more than others. The more sensitive fibers are those that have low cladding-to-core thickness ratios (low $\delta$). It is also known that for a fiber there is an optimal spacing between deformations, $l_c$ FIG. 1, that will produce the greatest change in transmission loss dT for a given depth of deformation dZ. For step-index fiber, the critical length that gives the greatest dT/dZ is given by the expression:

$$l_c = \sqrt{B2} \times \pi \, na/NA \tag{1}$$

where:

a = fiber core radius
n = index of refraction of core
NA = numerical aperature of the fiber The microbend transducer in the accelerometer, FIG. 1, uses step-index multimode fiber having a core diameter of 120 $\mu$m, with an aluminum jacket approximately 10 $\mu$m thick. The NA is 0.2 and the refractive index of the core is 1.46. The value of $l_c$ calculated from equation (1) is 1.95 mm. This is the spacing to be used in the sensor test.

While a step-index multimode fiber was used in the test system, the device will work with graded index fiber and single mode fiber as well.

The number of deformations of the fiber affects the mechanical stiffness of the sensor. A compromise between the fiber stiffness and the design resonance of 300 Hz led to the selection of 5 deformations. Values of fiber stiffness vs. the mechanical quiescent (bias) operating point were experimentally determined. A 300 Hz resonance was necessary to ensure an operational bandwidth of 1 to 100 Hz. The high sensitivity of a microbend sensor has been demonstrated in the laboratory using an LED as the light source, displacements as small as 0.04A at 800 Hz have been measured with a dynamic range of almost 90 dB over minimum detectable. To work as an accelerometer, the microbend sensor must be mass loaded with a system resonant frequency that is much greater than the bandwidth of interest. The equation of motion for a spring-mass system is:

$$my = -k(y-x) - c(y31\,x) \tag{2}$$

where:

k is the spring constant of the system
y is the coordinate of the mass
x is the coordinate of the case
y,x are the respective velocities
c is the damping coefficient
y is the acceleration of the mass.

If c=0 and $\Delta Z$ is the displacement of the mass relative to the case (and also the depth of deformation of the fiber, where $\Delta Z = y - x$, then solving the equation of motion gives:

$$\Delta = (\omega/\omega_n)^2 \, \Delta X / [1 - \omega/\omega_n^2] \tag{3}$$

where:

$\omega = 2\pi f$ = angular frequency of excitation
$\omega_n$ = resonant frequency of the system
$\Delta Z$ = amplitude of the fiber deformation
$\Delta x$ = the accelerometer case displacement For the device to work as an accelerometer the excitation frequency $\omega$ must be well below the resonance. For equation (3) becomes:

$$\Delta Z = \omega^2 \Delta x / \omega_n \quad (4)$$

The absolute acceleration of the case is given by:

$$A_{case} = \omega^2 \Delta x \quad (5)$$

Combining equations (4) and (5) gives:

$$A_{case} = \omega_n^2 \Delta Z \quad (6)$$

The minimum detectable acceleration, $A_{min}$ for a shot-noise limited sensor is:

$$A_{mion} = [2Th\nu\Delta f/qW_o]^{1/2} (\Delta T/\Delta A)^{-1} \quad (7)$$

where
T = optical transmission coefficient
h = Planck's Constant
$\nu$ = light frequency
$\Delta f$ = detection bandwidth
q = photodiode quantum efficiency
$W_oT$ = light power incident on the photodetector
$\Delta T/\Delta A$ can be written as:

$$\Delta T/\Delta A = (\Delta T/\Delta Z)(\Delta Z/\Delta A) \quad (8)$$

where $\Delta z/\Delta A$ is the fiber deformation resulting from the case acceleration A. From equation (6) it can be seen that $\Delta Z/\Delta A_{case} = 1/\omega_n^2$ $$\text{Thus, } A_{min} = [2Th\nu\Delta f/qw_{20}]^{1/2} \omega_n^2 (\Delta T/\Delta Z)^{-1} \quad (9)$$

The accelerometer bandwidth of interest was chosen to be 1 to 100 Hz. The resonance of the accelerometer was chosen to be at least 3 times the upper limit, or 300 Hz. To obtain this resonance frequency, the amount of mass and the stiffness of the system must be considered. Because the test device must measure horizontal acceleration, the microbend transducer cannot use gravity to position the mass on the moving deformers. This means that another compliant member must be present in the system to position the mass while allowing it to move relative to the case, and along only one axis. The resulting system is illustrated in FIG. 2.

Figure 2:
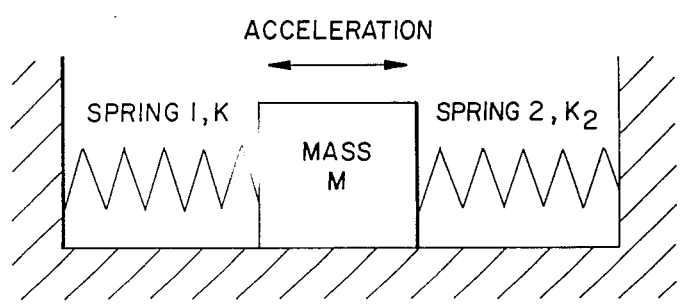
FIG. 2 diagrammatically illustrates an accelerometer spring-mass system.

In FIG. 2, $K_1$ is the spring constant of the fiber, $K_2$ is the spring constant of the locating member, and M is the mass. This mass moves between these two springs. If $K_1 = K_2$ the natural frequency of the system is:

$$f_n = (2\pi)^{-1}(K_1 + K_2)/M \quad (10)$$

For 5 deformations of the aluminum-coated fiber at relatively large quiescent depths, $K_1$ has been measured to be $1.3 \times 10^9$ dyn/cm. For an easily predictable motion, the locating member is designed to have the same spring constant. The type of member chosen was a cantilever beam as shown in FIG. 3. This approach has several advantages. First, cantilever beam theory is well developed. It is a simple task to determine design dimensions that give the beam the required stiffness. Second, the beam positions the mass independently from the fiber so the initial quiescent can be set and reset easily by sliding the entire spring-mass assembly towards the deformers. Third, the cantilever can be designed to have its significant movement along only one axis, thereby reducing cross-axis sensitivity. By making the beam wider than it is thick, the beam has its highest compliance perpendicular to the beam's length.

Several experiments were performed to investigate the performance of the accelerometer. Included in the tests were measurements of the device's frequency response, minimum detectable acceleration, and dynamic range. Shown in FIG. 4 is a block diagram of an experimental set-up. A calibrated PZT stack of known displacement (60Å/V) was used to excite the accelerometer. A Hewlett-Packard 3582A spectrum analyzer was used to record the results.

Some results of the experiments are shown in FIGS. 5 and 6. The response of the device versus frequency for a constant acceleration is shown in FIG. 5. As can be seen, the response is flat to within +1dB over the recorded frequency range. In FIG. 6, the output of the device for a 20 $\mu$g acceleration at 8.8 Hz is shown. Also shown is the output of the device with no drive signal. As can be seen, the signal-to-noise is near 14 dB and thus the minimum acceleration measured at 8.8 Hz is near 4$\mu$gs.

Referring now to FIG. 7, the microbend sensor utilizes very simple and common electronics to power the unit and provide an output voltage proportional to the change in received light at the photodetector 40.

The circuitry consists of three different sections, the first being a current source section 42 that powers the LED 44. Since the accelerometer is to be used as an AC device, low frequency (i.e. 0.5 Hz) in light level fluctuations are filtered from the signal, so a simple current regulator 46 is all that is needed for the LED 44.

The second section is a current-to-voltage converter 48 which has its input from the photodiode 40. This is a common device that uses an OP-AMP and a feedback resistor to gain the output of the photodiode and provide a voltage input to the filtering section 50.

This third filtering section uses three filters in line to give the accelerometer the desired output characteristics. The first is a high pass with a roll-off frequency at 0.5 Hz. This eliminates the low frequency fluctuations in signal due to the LED output varying. Next, the signal is passed through a 100 Hz low pass filter to give the accelerometer the required operating bandwidth of 1 to 100Hz. The final filter is a notch-type used to defeat the signal at the mechanical system's resonant frequency of 320 Hz. The output of this filter is the output of the sensor.

We claim:

1. A fiber optic microbend accelerometer comprising a rigid housing, a beam connected at one end to the housing, and a mass connected at the other end of the beam, the connected mass being free to move within the housing upon application of force to the housing in a direction normal to the plane of the beam, a pair of fiber deforming teeth sets mounted in opposed relation, one to the mass and the other to the housing, and an optical fiber positioned between the pair of teeth sets and in contact with the teeth, means for directing radiant energy into an input end of the fiber and means for analyzing the radiant energy at an output end of the fiber.

2. The accelerometer as defined in claim 1 wherein the beam has a greater width than thickness.

3. The accelerometer as defined in claim 2, wherein the beam is most compliant parallel to said direction normal to the plane of the beam.

4. The accelerometer as defined in claim 1 wherein the fiber is aluminum coated.

5. The accelerometer as defined in claim 1, wherein each of said pair of fiber deforming teeth sets comprise approximately five deformation teeth.

6. The accelerometer as defined in claim 5, wherein said beam and said mass are adapted to have a natural resonance frequency of about 300Hz whereby an operational bandwith of the system at between about 1 to about 100Hz is achieved.

7. The accelerometer as defined in claim 6, further comprising electronic means for analyzing the radiant energy emitted by said output end of said fiber and producing an output signal including a high-pass filter with a roll-off frequency of about 0.5Hz and a low-pass filter having a roll-off frequency of about 100Hz.

8. The accelerometer as defined in claim 7, wherein said electronic means further comprises a notch-type filter providing for the elimination of the signal corresponding to the beam and mass natural resonant frequency at about 300Hz from said output signal.

9. A fiberoptic microband accelerometer comprising:
 (a) a supporting surface having a set of fiber deforming teeth;
 (b) an assembly including resilient cantilevered member having a supporting end connected to and being supported by a support member in turn connected to said support surface, and a mass connected to a second cantilevered member end, opposite said cantilevered member from the supporting end, said mass being constrained to move only in a direction normal to an axis parallel to a direction between said supporting end and said mass end, said mass further including a surface having a set of fiber deforming teeth being disposed opposite said supporting surface fiber deforming teeth;
 (c) an optical fiber for propagating an optical beam having an input end and an output end and positioned between said two sets of fiber deforming teeth and in contact therewith;
 (d) means for directing an optical bean into said input end of said optical fiber; and
 (e) electronic means for analyzing said optical beam emanating from said output end of said optical fiber, and for providing an analyzed signal, whereby said cantilevered member-mass assembly has a natural resonant frequency and said electronic means include filtering means for substantially eliminating said natural resonant frequency from said analyzed signal.

10. The accelerometer as defined in claim 9, wherein said cantilevered member has a greater width than thickness.

11. The accelerometer as defined in claim 10, wherein said cantilevered member is most compliant normal to the direction of said axis.

12. The accelerometer as defined in claim 9, wherein the optical fiber is aluminum-coated.

13. The accelerometer as defined in claim 9, wherein said electronic means includes a low-pass filter having a roll-off frequency of about 100Hz and a high-pass filter having a roll-off frequency at about 0.5Hz whereby the operational frequencies utilized by the accelerometer are between about 1Hz and about 100Hz.

14. The accelerometer as defined in claim 13, wherein said cantilevered member-mass assembly has a natural resonant frequency at approximately 300Hz and said filtering means comprises a notch-type filter having an operative frequency at approximately 300Hz for substantially eliminating the natural resonant frequency from said analyzed signal.

* * * * *

UNITED STATES PATENT AND TRADEMARK OFFICE
CERTIFICATE OF CORRECTION

PATENT NO. : 4,800,267

DATED : January 24, 1989

INVENTOR(S) : FREAL et al

It is certified that error appears in the above-identified patent and that said Letters Patent is hereby corrected as shown below:

Column 2, Equation (1) should read:

$$l_c = \sqrt{2} \cdot \pi \cdot n \cdot a/NA \qquad (1)$$

Column 2, Equation (2) should read:

$$m\ddot{y} = -k(y-x) - c(\dot{y}-\dot{x}) \qquad (2)$$

where: k is the spring constant of the system y is the coordinate of the mass x is the coordinate of the case $\dot{y}, \dot{x}$ are the respective velocities c is the damping coefficient $\ddot{y}$ is the acceleration of the mass.

Column 2, Equation (3) should read:

$$\Delta z = (\omega/\omega_n)^2 \, \Delta X/[1-(\omega/\omega_n)^2] \qquad (3)$$

where z = amplitude of the fiber deformation

UNITED STATES PATENT AND TRADEMARK OFFICE
CERTIFICATE OF CORRECTION

PATENT NO. : 4,800,267

DATED : January 24, 1989

INVENTOR(S) : Freal et al

It is certified that error appears in the above-identified patent and that said Letters Patent is hereby corrected as shown below:

Column 3, Equation (4) should read:

$$\Delta z = \omega^2 \Delta x / \omega_n^2 \qquad (4)$$

Column 3, line 9, change "(51)" to --(5)--.

Column 3, line 13, change "(61)" to --(6)--.

UNITED STATES PATENT AND TRADEMARK OFFICE
CERTIFICATE OF CORRECTION

PATENT NO. : 4,800,267

DATED : January 24, 1989

INVENTOR(S) : Freal et al

It is certified that error appears in the above-identified patent and that said Letters Patent is hereby corrected as shown below:

Column 3, Equations 7, 8 and 9 should read:

$$A_{min} = [2Th\nu\Delta f/qW_o]^{1/2} \ (\Delta T/\Delta A)^{-1} \quad (7)$$

where $T$ = optical transmission coefficient $h$ = Planck's Constant $\nu$ = light frequency $\Delta f$ = detection bandwidth $q$ = photodiode quantum efficiency $W_o T$ = light power incident on the photodetector $\Delta T/\Delta A$ can be written as:

$$\Delta T/\Delta A = (\Delta T/\Delta z)(\Delta z/\Delta A) \quad (8)$$

where $\Delta z/\Delta A$ is the fiber deformation resulting from the case acceleration $\Delta A$. From equation (6) it can be seen that $\Delta z/\Delta A_{case} = 1/\omega_n^2$ $$\text{Thus,} \ A_{min} = [2Th\nu\Delta f/qW_o]^{1/2} \ \omega_n^2 (\Delta T/\Delta z)^{-1} \quad (9)$$

UNITED STATES PATENT AND TRADEMARK OFFICE
CERTIFICATE OF CORRECTION

PATENT NO. : 4,800,267
DATED : January 24, 1989
INVENTOR(S) : Freal et al

It is certified that error appears in the above-identified patent and that said Letters Patent is hereby corrected as shown below:

Column 3, Equation (10) should read:

$$f_n = (2\pi)^{-1} [(K_1 + K_2)/M]^{1/2}$$

Column 4, line 15 "+" should be --$\pm$--.

Claim 9, Column 6, line 5 "bean" should be --beam--.

The Equation in the heading of Figure 5 should read:

$$(a = 50 \times 10^{-6} g)$$

Signed and Sealed this

Twenty-ninth Day of August, 1989

Attest:

DONALD J. QUIGG

Attesting Officer

Commissioner of Patents and Trademarks